(12) United States Patent
Kang et al.

(10) Patent No.: US 6,690,361 B1
(45) Date of Patent: Feb. 10, 2004

(54) TOUCH PANEL

(75) Inventors: Min-goo Kang, Pusan (KR); Sung-ku Kang, Pusan (KR)

(73) Assignee: Samsung SDI Co., Ltd., Suwon (KR)

( * ) Notice: Subject to any disclaimer, the term of this patent is extended or adjusted under 35 U.S.C. 154(b) by 484 days.

(21) Appl. No.: 09/598,973

(22) Filed: Jun. 22, 2000

(30) Foreign Application Priority Data

Jun. 23, 1999 (KR) .......................... 1999-23812

(51) Int. Cl.[7] .................................. G09G 5/00
(52) U.S. Cl. ...................... 345/173; 345/174
(58) Field of Search ............... 345/90, 95, 96, 345/87, 173, 174, 157, 160, 901, 810; 348/211; 428/100; 200/5; 357/51; 178/18.06

(56) References Cited

U.S. PATENT DOCUMENTS

| | | | | |
|---|---|---|---|---|
| 4,594,482 A | * | 6/1986 | Saito et al. .................... 200/5 |
| 4,949,153 A | * | 8/1990 | Hirao et al. .................. 357/51 |
| 5,543,588 A | * | 8/1996 | Bisset et al. .................. 178/18 |
| 5,886,687 A | * | 3/1999 | Gibson ..................... 178/18.06 |
| 5,920,310 A | * | 7/1999 | Faggin et al. ............... 345/173 |
| 6,177,327 B1 | * | 1/2001 | Chao .......................... 438/396 |
| 6,210,771 B1 | * | 4/2001 | Post et al. .................. 428/100 |
| 6,310,611 B1 | * | 10/2001 | Caldwaell .................... 345/173 |

* cited by examiner

Primary Examiner—Amare Mengistu
Assistant Examiner—Prabodh M. Dharia
(74) Attorney, Agent, or Firm—Leydig, Voit & Mayer, Ltd.

(57) ABSTRACT

A touch panel includes an upper substrate on which an upper transparent conductive layer and strip-like upper electrodes are located a lower substrate facing the upper substrate and on which a patterned lower transparent conductive layer and strip-like lower electrodes are located dot spacers for maintaining the spacing between the upper and lower substrates, and a flexible cable electrically connected to the upper and lower electrodes and to which power is applied. One of the electrodes and the transparent conductive layers have their area varying in proportion to the line resistance of the electrodes so that equipotential lines are uniformly formed between the electrodes.

2 Claims, 3 Drawing Sheets

TOUCH PANEL

BACKGROUND OF THE INVENTION

1. Field of the Invention

The present invention relates to a touch panel and more particularly, to a touch panel in which the structure of electrodes or transparent conductive layers is improved so that equipotential lines may be uniformly spaced on a panel.

2. Description of the Related Art

Touch panels and digitizers are examples of common input devices. Input devices enable users to connect with a button shown on a display by touching or not touching the button using a finger or a penlike input means, and then to easily use information contained in a panel display device which is electrically connected to them. Of the input devices, a touch panel, which is configured in such a way to be integrated with a panel display device, is one of the input devices most suited for the current trends towards subminiature and ultralight technology such as handheld computers and a personal information terminal. There are several types of touch panels: analog resistive, digital resistive, capacitive, surface acoustic wave and infrared types.

In a touch panel, upper and lower substrates are combined with each other between which dot spacers are interposed. Upper and lower electrodes are located the upper and lower substrates, respectively. If any one point of the upper substrate is touched by an input means, the upper and lower electrodes conduct through each other. Then, a control device reads a voltage value changed by the resistance value of that point, and converts it into a digital value according to a change in an electrical potential difference to detect a position coordinate.

However, in a conventional touch panel, a voltage drop occurs from the line resistance of the upper and lower electrodes. Thus, when points which are at the same distance from the electrodes are touched, equipotential lines are not formed uniformly. For this reason, resistance for the desired position cannot be read accurately. According to a conventional art, various ways have been devised to minimize voltage drop. A widely used method is to make electrodes as wide and as thick as possible. However, this method has a disadvantage in that a restriction in the area of a touch panel limits the layout. Further, this method can only mitigate linearity but cannot remove that property completely.

SUMMARY OF THE INVENTION

To solve the above problem, it is an object of the present invention to provide a touch panel in which the shape of electrodes or transparent conductive layers is changed to minimize the line resistance of the electrodes and to form uniform equipotential lines.

Accordingly, to achieve the above object of the present invention, there is a provide a touch panel including an upper substrate over one portion of which an upper transparent conductive layer is formed, upper electrodes underlying the upper transparent conductive layer in strips, a lower substrate which is installed to face the upper substrate and on the top of which a patterned lower transparent conductive layer is formed, lower electrodes which are formed in strips so as to conduct with the lower transparent conductive layer, dot spacers which are interposed between the upper and lower substrates to maintain an interval therebetween, and a flexible printed cable which is electrically connected to the upper and lower electrodes and to which a predetermined power is applied.

One of the electrodes and the transparent conductive layers have their area formed differently in proportion to the line resistance of the electrodes so that equipotential lines may uniformly be formed between the electrodes. Further, the sectional area of the electrodes from a power application point to both ends of the left and right sides is configured to be gradually increased in proportion to the line resistance of the electrodes. In addition, the area of the transparent conductive layers from a power application point to both ends of the left and right sides in contact with the electrodes is configured to be increasingly larger in proportion to the line resistance of the electrodes.

BRIEF DESCRIPTION OF THE DRAWINGS

The above object and advantage of the present invention will become more apparent by describing in detail a preferred embodiment thereof with reference to the attached drawings in which.

DESCRIPTION OF THE PREFERRED EMBODIMENTS

Figure 1:
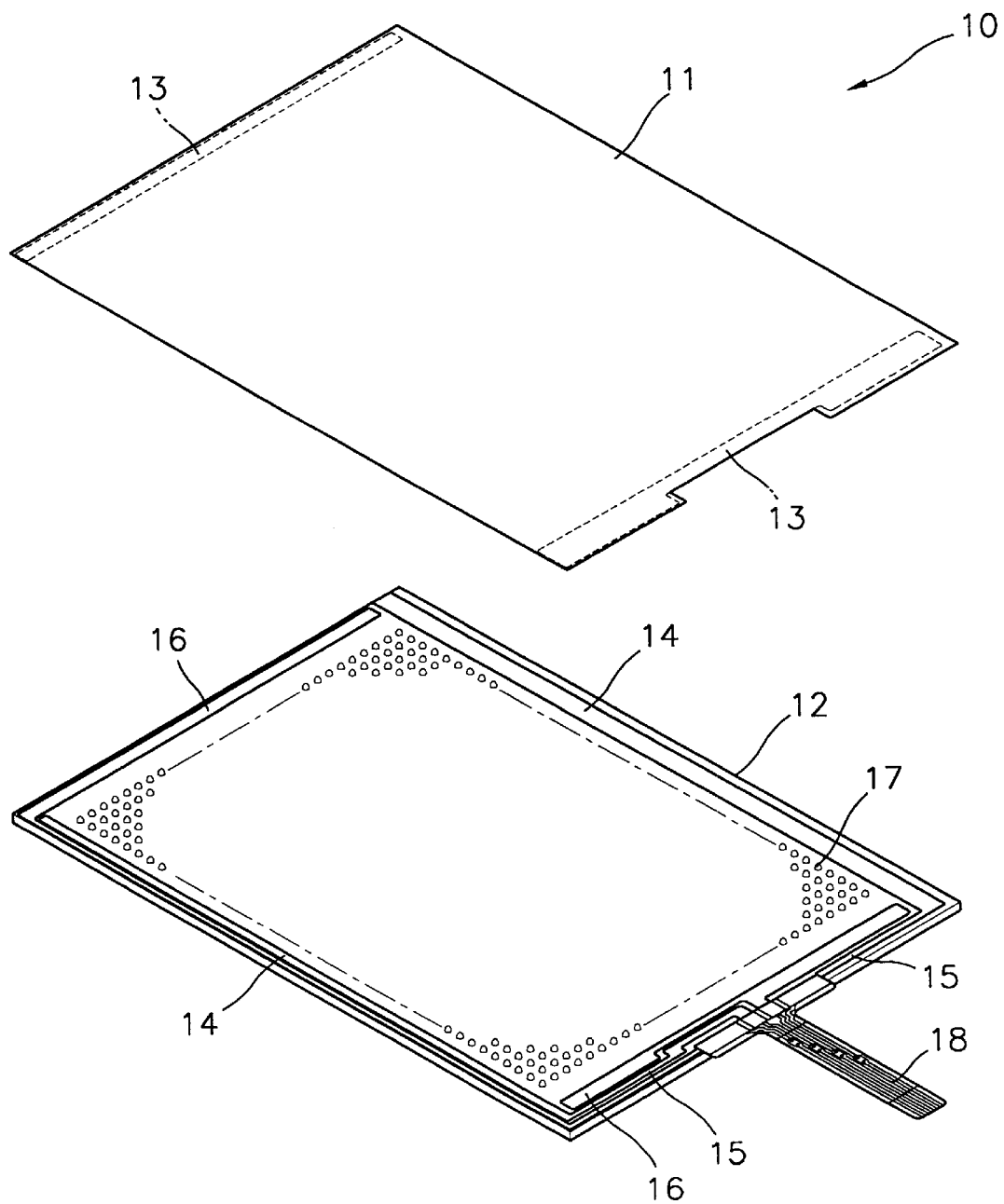
FIG. 1 is an exploded perspective view of a touch panel according to the present invention.

Referring to FIG. 1, touch panel 10 includes upper and lower substrates 11 and 12. The upper substrate 11 is a flexible film. This film includes a polymer resin layer directly touched by an input means such as a pen or a finger, preferably polyethylene terephtalate (PET), and an upper transparent conductive layer such as indium tin oxide (ITO) under the PET layer. A plurality of strip-like upper electrodes 13 are located along opposite edges of the upper substrate 11.

The lower substrate 12 is comprised of a transparent glass having a size corresponding to the upper substrate 11. A lower transparent conductive layer selectively on the top of the lower substrate 12. On the lower substrate 12, a plurality of strip-like lower electrodes 14 are located along opposite edges of the substrate 12 at positions which are different from the edges on which the upper electrodes 13 are located. An extension line 15 extends from one end of each of the lower electrodes 14 and is incorporated therewith. A wiring line 16 which conducts through the upper electrodes 13 is located on the lower substrate 12. The extension line 15 and the wiring line 16 gather together so that power can be applied to any one point of the lower substrate 12. In this case, it is preferable that the upper and lower electrodes 13 and 14, the extension line 15, and the wiring line 16 are formed of Ag paste.

Further, an adhesive tape (not shown) is attached to the edges of the upper and lower substrates 11 and 12 for adhesion of the upper and lower substrates 11 and 12 and for mutual insulation of the upper and lower electrodes 13 and 14. A connection hole is formed on the adhesive tape for the electrical connection of the upper electrodes 13 and the wiring line 16. Dot spacers 17 are formed on the lower substrate 12. The dot spacers 17 are formed in such a way to appropriately maintain the spacing between the upper and lower substrates 11 and 12, and the height of the dot spacers 17 is about 4–5 $\mu$m. Further, a flexible printed cable 18 is installed on the lower substrate 12 and electrically connected to the extension line and the wiring line 16 gathering together at one point.

Figure 2:
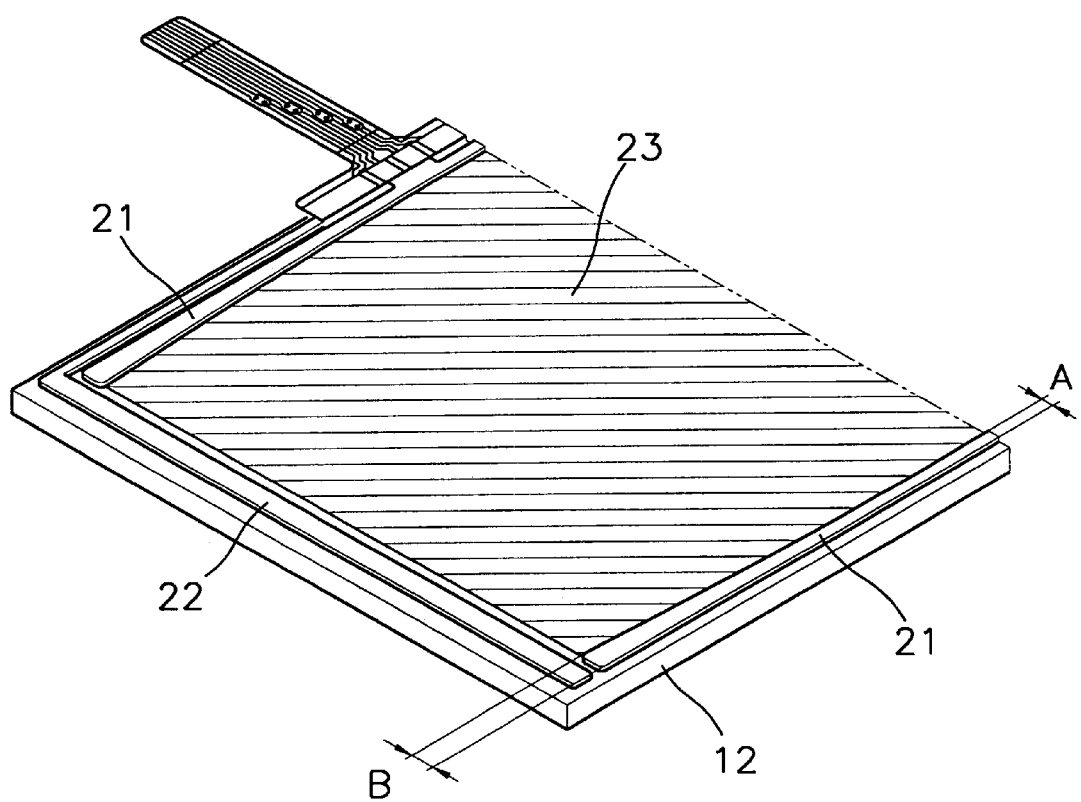
FIG. 2 is an enlarged perspective view showing a part of a touch panel according to a first preferred embodiment of the present invention.

According to the present invention, the shape of the electrodes or the transparent conductive layer is transformed so that equipotential lines can be 16 uniformly spaced at points which are at the same distance from the electrodes 13 and 14 to eliminate linearity. Referring to FIG. 2, which is an enlarged view of a portion of the touch panel according to a first embodiment of the present invention, a transparent conductive layer 23, such as an ITO layer is provided over the lower substrate 12 in a predetermined pattern. On top of the transparent conductive layer, 23, the lower electrodes 21 conducting therewith are formed along the edges of the substrate 12. A wiring line 22 connectable with the upper electrodes 13 as previously shown in FIG. 1 lies in a direction perpendicular to the lower electrodes 21.

In this case, the lower electrodes 21 or the wiring line 22 gather together at the center of one side of the lower substrate 12 and are electrically connected to a flexible printed cable 18. In order to prevent a voltage drop from occurring on the line of the strip-like lower electrodes 21 when power is applied to such a power application point, the width of the lower electrodes 21 varies along the length of the lower electrodes. This means that the width of the electrodes 21 becomes increasingly larger from the center of the substrate 12, to which power is applied toward the edges thereof. Such a change in the width is proportional to a line resistance according to the length of the electrodes 21 ranging from the power application point to the left and right ends of the electrodes. As shown in FIG. 2, the electrodes 21 have a width denoted by A in the center thereof and a width denoted by B in one end thereof which is larger than the width A. In addition, from the width A to the width B, the electrodes 21 have different cross-sectional areas varying in proportional to line resistance. Accordingly, these features enable the formation of uniform equipotential lines.

To further assure uniform equipotential lines, the operation of a touch panel according to the present invention will now be described in detail. When a voltage is applied to the touch panel 10 through the flexible printed cable 18, the user applies pressure on any one point of the polymer resin layer of the upper substrate 11 with a finger or a pen-like input means. This causes an upper transparent conductive layer underlying the polymer resin layer and a lower transparent conductive layer on a lower substrate 12 to contact each other. Thus, the upper and lower electrodes 13 and 14 conduct. A control device reads a voltage value changed by a resistance at that point, and thereafter converts that value, into a digital value according to a change in potential difference, to detect a position coordinate.

In this case, as current flow in the lower substrate 12 goes from the center, to which power is applied, to both ends at the left and right sides, the electrical conductivity of the lower electrodes 21 become lower due to a line resistance. In order to prevent this, as shown in FIG. 2, the cross-sectional area of the electrodes 21 is configured to become larger as the substrate 12 extends from the center to both ends at the left and right sides. Accordingly, the cross-sectional area at the center of the electrodes 21 is smaller than that at both ends at the left and right sides to thereby increase resistance. Contrarily, the cross-sectional area at the left and right sides is larger than at the center to reduce resistance, so that electrical conductivity can be improved.

As a result of changing the cross-sectional areas in proportion to the line resistance of the electrodes 21 as described above, equipotential lines can be uniformly formed allowing the touch panel to accurately read a position value. Further, although FIG. 2 is shown only relating to the lower electrodes 21, the same is true of upper electrodes on an upper substrate.

Figure 3:
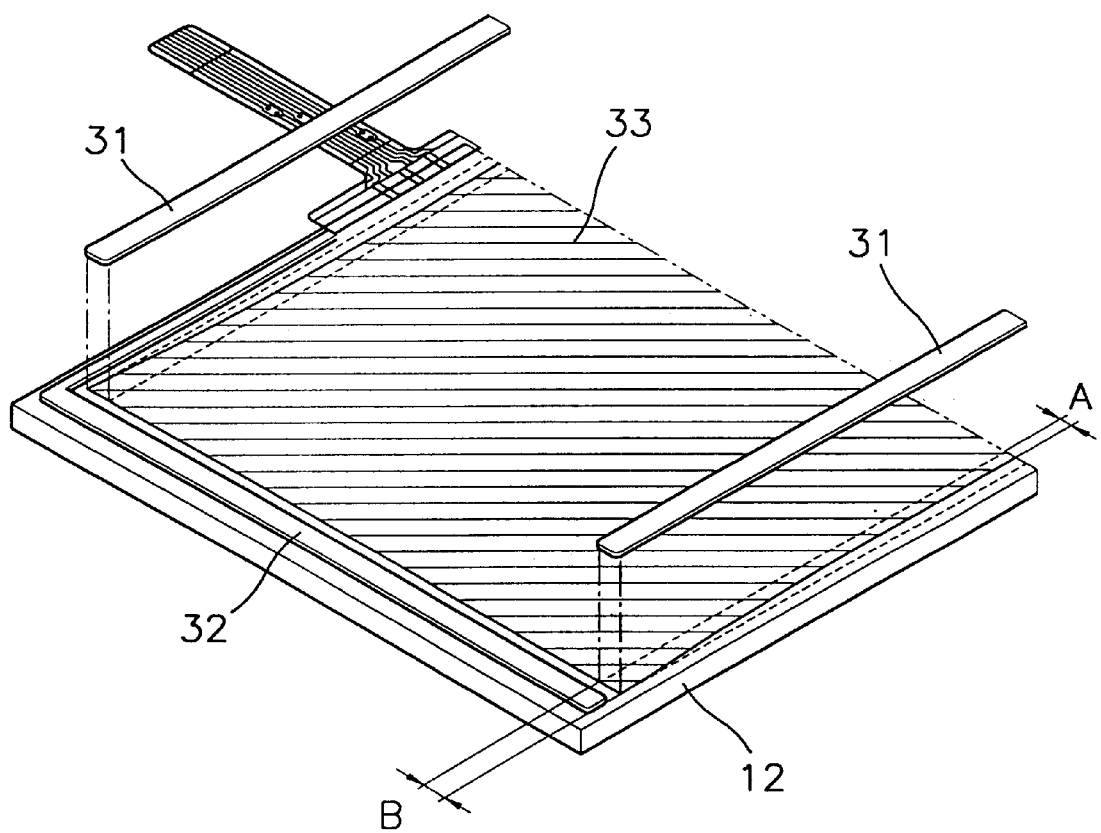
FIG. 3 is an enlarged perspective view showing a part of a touch panel according to a second preferred embodiment of the present invention.

Referring to FIG. 3, which is an enlarged view of a portion of the touch panel according to a second embodiment of the present invention, the shape of a transparent conductive layer 33 on the lower substrate 12 is transformed instead of the electrodes 21 in contact with the transparent conductive layer 23 shown it in FIG. 2. In other words, according to this embodiment, the contact area of the transparent conductive layer 33 conducting through the lower electrodes 31 is varies from the center of the substrate 12 in contact with the electrodes 31 to the edges thereof, in proportion to the line resistance of the electrodes 31. At the center of the transparent conductive layer 33, to which power is applied, the width of the contact with the electrodes 31 is A, while at the edges thereof, the contact area gradually increases to B. The details of the operation according to the preferred embodiment are omitted since they are the same as those described in FIG. 2.

As described in the foregoing, a touch panel according to the present invention enables the formation of uniform equipotential lines by varying the sectional area of electrodes or contact area of a transparent conductive layer in proportion to the line resistance of upper and lower electrodes. Thus, this allows the touch panel to read a voltage changed by the resistance of a specific point touched by an input means.

While this invention has been particularly shown and described with reference to preferred embodiments thereof, it should be understood that various alternatives and modifications can be devised by those skilled in the art without departing from the spirit and scope of the invention as defined by the appended claims.

What is claimed is:

1. A touch panel comprising:

an upper substrate including a first surface covered with an upper transparent electrically conductive layer and a pair of upper electrodes disposed between the upper substrate and the upper transparent electrically conductive layer and arranged in strips along two opposite edges of the upper substrate;

a lower substrate having a first surface facing the first surface of the upper substrate and a lower transparent electrically conductive layer, a first pair of lower electrodes arranged in strips, transverse to the pair of the upper electrodes, in contact with and conducting through the lower transparent electrically conductive layer, and a second pair of lower electrodes parallel to, aligned with, and in contact with the respective first pair of upper electrodes, wherein when the upper and lower transparent electrically conductive layers are brought into contact at a position by application of pressure to the upper and lower substrates, the position of the contact is indicated by changes in voltages applied through the first and second pairs of lower electrodes;

dot spacers interposed between the upper and lower substrates to maintain an interval between the upper and lower substrates at positions where the dot spacers are present; and a flexible cable including respective conductors electrically connected to the first and second pairs of lower electrodes and through which power may be applied, wherein at least the second pair of lower electrodes has a cross-sectional area varying in proportion to linear resistance of the second pair of lower electrodes so that equipotential lines are uniformly formed between the first and second pairs of lower electrodes when power is applied to the pair of upper electrodes and the first and second pairs of lower electrodes through the cable, and the cross-sectional areas of the second pair of lower electrodes, from a power application point where the flexible cable is connected to the second pair of lower electrodes to remote ends of the second pair of lower electrodes, increase in proportion to the linear resistance of the second pair of lower electrodes.

2. A touch panel comprising:

an upper substrate including a first surface covered with an upper transparent electrically conductive layer and a pair of upper electrodes disposed between the upper substrate and the upper transparent electrically conductive layer and arranged in strips along two opposite edges of the upper substrate;

a lower substrate having a first surface facing the first surface of the upper substrate and a lower transparent electrically conductive layer, a first pair of lower electrodes arranged in strips, transverse to the pair of the upper electrodes, in contact with and conducting through the lower transparent electrically conductive layer, and a second pair of lower electrodes parallel to, aligned with, and in contact with the respective first pair of upper electrodes, wherein when the upper and lower transparent electrically conductive layers are brought into contact at a position by application of pressure to the upper and lower substrates, the position of the contact is indicated by changes in voltages applied through the first and second pairs of lower electrodes;

dot spacers interposed between the upper and lower substrates to maintain an interval between the upper and lower substrates at positions where the dot spacers are present; and a flexible cable including respective electrical conductors electrically connected to the first and second pairs of lower electrodes and through which power may be applied, wherein areas of contact between the second pair of lower electrodes and the lower transparent conductive layer varies in proportion to linear resistance of the electrodes so that equipotential lines are uniformly formed between the first and second pairs of lower electrodes when power is applied to the first upper electrodes and the first and second pairs of lower electrodes through the cable, and the areas of contact between the second pair of lower electrodes and the lower transparent electrically conductive layer, from a power application point where the flexible cable is connected to the second pair of lower electrodes to remote ends of the second pair of lower electrodes in contact with the lower transparent electrically layer, conductive layer increases in proportion to the linear resistance of the second pair of lower electrodes.

* * * * *